US006680547B1

United States Patent
Dailey

(10) Patent No.: US 6,680,547 B1
(45) Date of Patent: Jan. 20, 2004

(54) POWER SHARING SYSTEM INCLUDING RECHARGEABLE POWER SOURCE

(75) Inventor: Christopher L. Dailey, Moyock, NC (US)

(73) Assignee: Innovations Electrical, LC, Moyock, NC (US)

( * ) Notice: Subject to any disclaimer, the term of this patent is extended or adjusted under 35 U.S.C. 154(b) by 0 days.

(21) Appl. No.: 10/210,721

(22) Filed: Aug. 1, 2002

(51) Int. Cl.7 ................................................. H02J 3/00
(52) U.S. Cl. .............................. 307/31; 307/24; 307/29
(58) Field of Search .............................. 307/18, 22, 23, 307/24, 29, 52, 62, 31

(56) References Cited

U.S. PATENT DOCUMENTS 4,729,086 A * 3/1988 Lethellier .................... 363/65
5,266,838 A * 11/1993 Gerner ........................ 307/19
5,949,153 A * 9/1999 Tison et al. .................. 307/29
6,455,954 B1 * 9/2002 Dailey ........................ 307/66
6,459,171 B1 * 10/2002 Leifer .......................... 307/52

* cited by examiner

Primary Examiner—Adolf D. Berhane
(74) Attorney, Agent, or Firm—Peter J. Van Bergen

(57) ABSTRACT

A power sharing system is provided for powering a plurality of loads using line voltage and a rechargeable source. Each load can be coupled to either the line voltage or the rechargeable source by means of a power source selector switch coupled to each load. A programmable controller is coupled to each power source selector switch to control a position thereof to maximize usage of the rechargeable source based on power requirements of the loads. The power sharing system can also recharge its rechargeable source during prescribed "off peak" times, and can provide power to the loads during times of power outages.

29 Claims, 3 Drawing Sheets

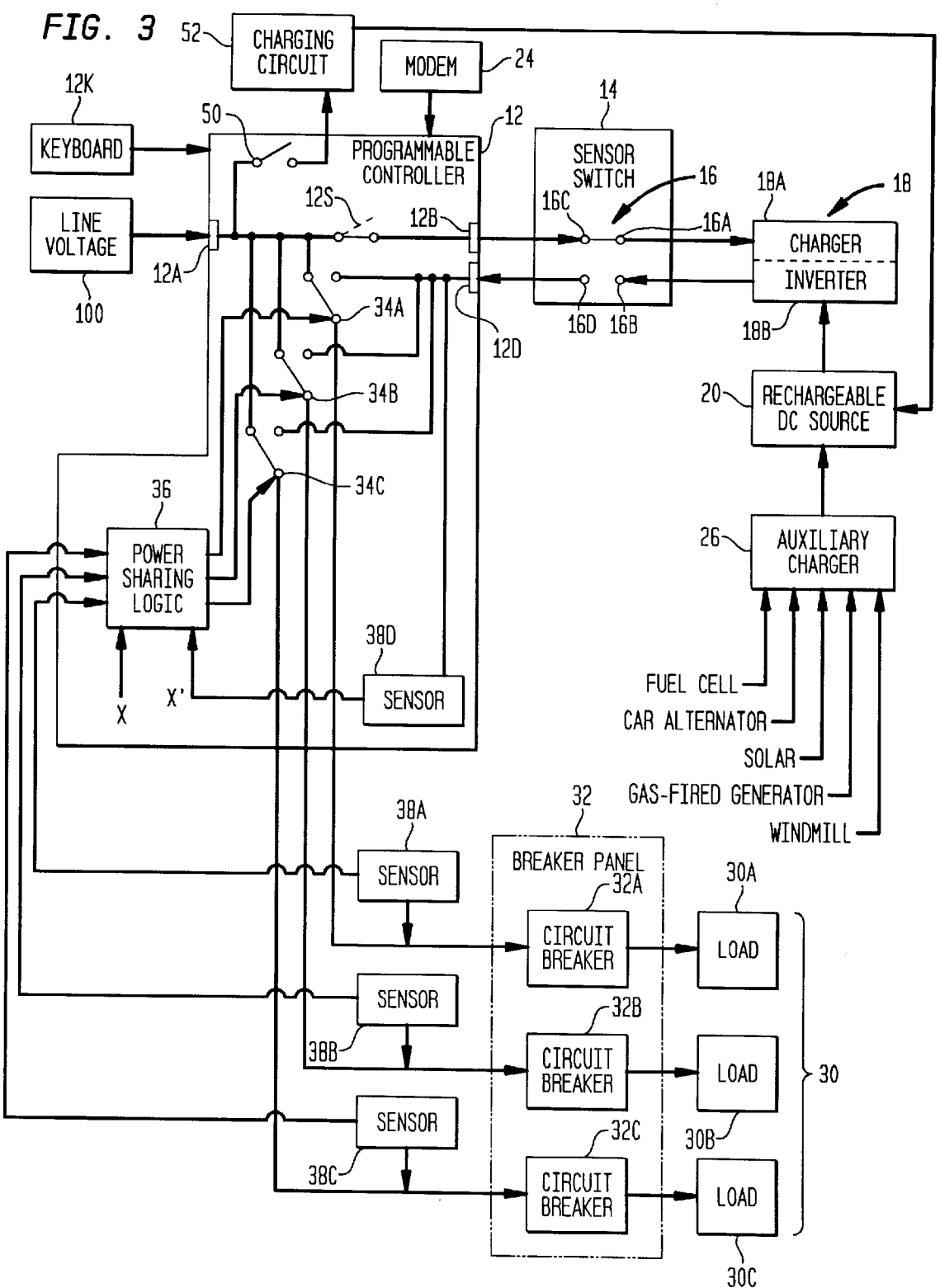

POWER SHARING SYSTEM INCLUDING RECHARGEABLE POWER SOURCE

FIELD OF THE INVENTION

The invention relates generally to control systems, and more particularly to a power sharing system that provides power to a plurality of loads using a rechargeable power source to supplement line power in order to reduce a consumer's peak usage used by a utility for setting a billing rate and to reduce overall usage of line power.

BACKGROUND OF THE INVENTION

Currently, most consumers purchase their electrical power from a local supplier that has purchased bulk power from generation sources. Typically, the consumer pays a rate predicated upon a rate schedule. Rates on the schedule are generally higher during "peak" time periods (e.g., periods falling between 6 AM and 11 PM when overall demand is higher) and lower during "off-peak" time periods (e.g., falling between 11 PM and 6 AM when overall demand is lower). Since most consumers use the majority of their electricity during peak time periods, most consumers pay an average rate which reflects the peak rate for the vast majority of their electrical power and are unable to avail themselves of the supplier's off-peak rate.

In addition, the various rate levels during both peak and off-peak times are predicated on peak usage. This means that momentary "spikes" of power demand can cause a consumer's rate for all of their usage to be billed at a higher rate. For example, if a consumer's usage is more or less steady at level X but occasionally spikes to 3X for brief periods (e.g., when air conditioning, hot tubs, washer/dryers, well pumps, or other motor driven appliances first turn on separately or more than one at a time), the consumer's rate for all power usage will be based on a rate for the 3X power level.

SUMMARY OF THE INVENTION

Accordingly, it is an object of the present invention to provide a system that lowers a consumer's peak level of electricity usage in order to reduce the rate level used by a utility to set a billing rate.

Another object of the present invention is to provide a system that continuously supplies electrical power to a consumer using both a line source and a rechargeable source.

Still another object of the present invention is to provide a system that continuously supplies electrical power to a consumer using both a line source and a rechargeable source in a way that maximizes usage from the rechargeable source in order to reduce usage from the line source.

Yet another object of the present invention is to provide a system that controls the sharing of power from a line source and a rechargeable source and that is easily added to a consumer's existing electrical infrastructure.

Other objects and advantages of the present invention will become more obvious hereinafter in the specification and drawings.

In accordance with the present invention, a power supply has a rechargeable DC source (e.g., batteries) coupled to an inverter/charger circuit that can convert a supplied AC voltage to a DC voltage to charge the batteries, and that can convert a DC output voltage from the batteries to an AC output voltage upon discharge of the batteries. A first switching means has an input port coupled to an AC voltage source and has an output port. The first switching means, programmable with at least one selected time period, couples the AC voltage source to the output port during a non-selected time period that is different than the selected time period and uncouples the AC voltage source from the output port during the selected time period. A second switching means is coupled to the output port for sensing thereon one of a normal AC voltage and an inadequate AC voltage. The second switching means has a switch coupled between the output port and the inverter/charger circuit. The switch is selectively placed in one of a first position when the normal AC voltage is sensed and a second position when the inadequate AC voltage is sensed. In the first position, the switch is positioned to so that the normal AC voltage is available across the switch and is supplied to the inverter/charger circuit as the supplied AC voltage. In the second position, the switch is positioned to receive the AC output voltage from the inverter/charger circuit as the DC batteries discharge. The AC output voltage from the inverter/charger circuit is available across the switch. A controlling means is coupled to the AC voltage source, the switch in its second position, and the plurality of loads. The controlling means includes a power source selector switch coupled to each load. Each power source selector switch can be positioned to be couple to one of the AC voltage source and the switch in its second position so that either the normal AC voltage or AC output voltage is available thereacross. The controlling means further includes a programmable means coupled to each power source selector switch to control a position thereof to maximize usage of the AC output voltage supplied by the power supply based on power requirements of the loads.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is another embodiment of the present invention that provides for recharging of the system's rechargeable source even when the rechargeable source is being used to supply power.

DETAILED DESCRIPTION OF THE INVENTION

Figure 1:
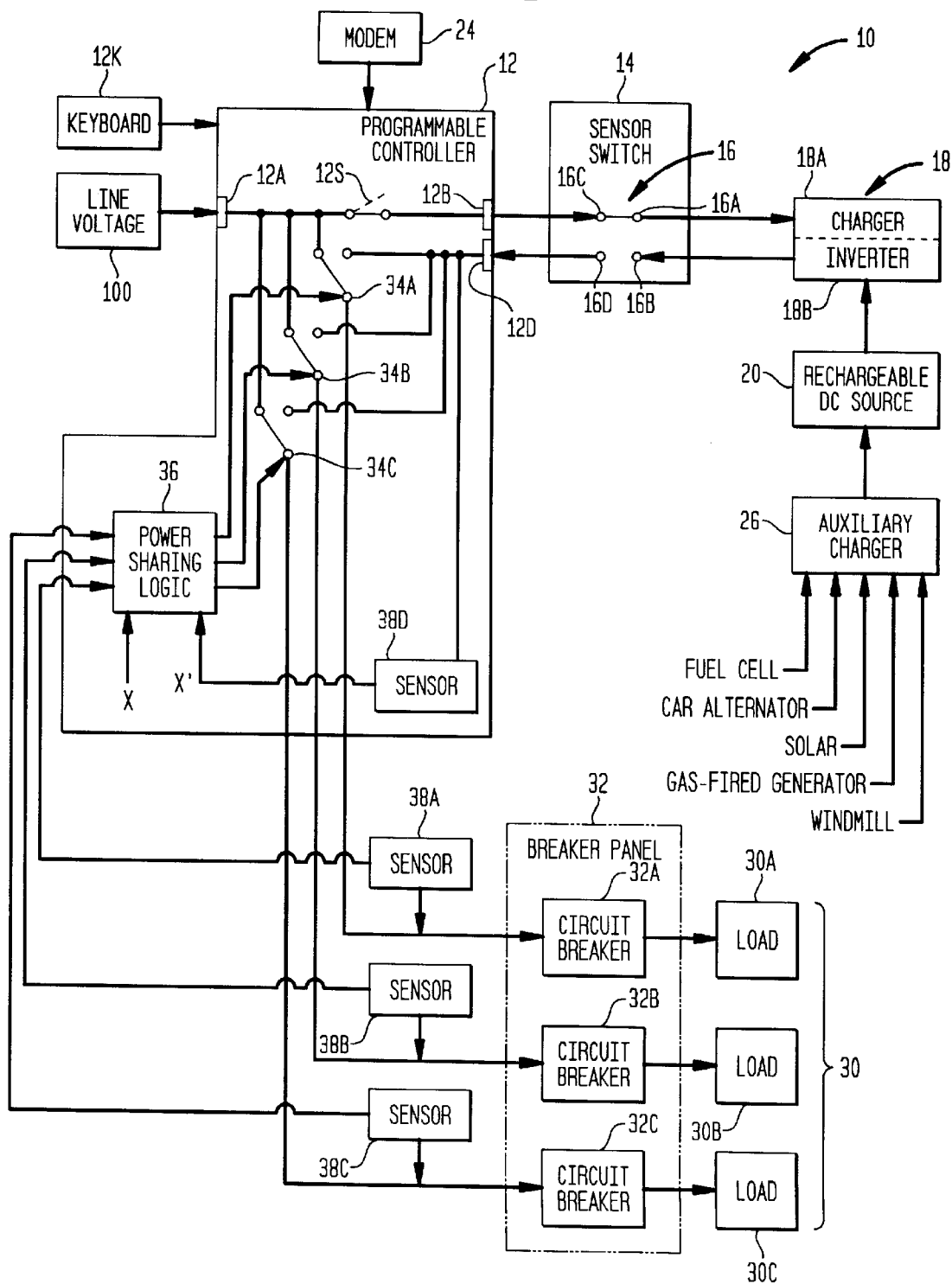
FIG. 1 is a top-level schematic diagram of an embodiment of a system that supplies power from both a line source and a rechargeable source to a plurality of loads in accordance with the present invention.

Referring now to the drawings and more particularly to FIG. 1, one embodiment of a system for supplying power to a plurality of loads in accordance with the present invention is shown and referenced generally by numeral 10. System 10 can serve as a consumer's primary power source during both selected times and times of emergency without disrupting operation at any of the selected loads as previously described by this applicant in U.S. patent application Ser. No. 09/583,513, the contents of which are hereby incorporated by reference. Since alternating current (AC) voltage is the supply standard, the present invention provides a continuous supply of AC voltage. However, it is to be understood that the present invention could also be used in an entirely DC voltage scenario.

System 10 is coupled to an AC voltage source such as a power utility's line voltage 100. It is to be understood that line voltage 100 is tapped into by system 10, but is not part of system 10. In a typical installation of system 10, line voltage 100 would be made available by connection to the line voltage line/terminal at a consumer's main breaker panel (not shown). Line voltage 100 is coupled to an input port 12A of a programmable controller 12 having the capability to selectively couple/uncouple line voltage 100 therethrough to an output port 12B. Coupled to output port 12B is a sensor switch 14 having the capability of sensing voltage at output port 12B and positioning an internal switch 16 predicated on the voltage sensed. Such sensor switches are well known in the art and are available commercially from, for example, Mastervolt, Amsterdam, The Netherlands, and Heart Interface Corporation, Kent, Wash.

One side of switch 16 is coupled to a rechargeable power supply that includes an inverter/charger circuit 18 and a rechargeable DC source 20. More specifically, line voltage 100 is supplied from output port 12B through contacts 16C and 16A of switch 16 to the charger portion 18A of circuit 18. The inverter portion 18B of circuit 18 is coupled to a battery port 12D of controller 12 via contacts 16B and 16D. Charger portion 18A supplies a charging voltage to rechargeable DC source 20 while inverter portion 18B receives a discharging voltage from rechargeable DC source 20 and converts same to an AC. output voltage available at battery port 12D via contact 16B. Such inverter/charger circuits 18 are well known in the art and will, therefore, not be described in further detail. Inverter/charger circuits are available commercially from, for example, Heart Interface Corporation, Kent, Wash., and Trace Engineering, Arlington, Wash.

Rechargeable DC source 20 can be one or more DC batteries having deep cycle capabilities. Such deep cycle batteries can be of the lead-acid or gel cell type. Note that for interior installations, gel cell batteries are preferred since they do not present any toxic leak problems.

System 10 can also include a remote communication device such as a modem 24 coupled to programmable controller 12 for the purpose of enabling the remote programming of controller 12 as will be explained further below. System 10 could also include an auxiliary charger 26 coupled directly to rechargeable DC source 20. Charger 26 can be an AC-to-DC or DC-to-DC charger based on the type of power source used which could include a fuel cell, an automobile alternator, a gasoline generator, a solar source, a windmill, etc. Auxiliary charger 26 provides for the recharging of rechargeable DC source 20 during times of extended power outages.

In one aspect of the present invention, system 10 assumes that most consumers rely on line voltage 100 as their sole source of electrical power. As a result of this fact, consumers are totally reliant on the supplying utility's reliability and costing structure that prices power higher or lower depending on the peak level of usage and time of the day at which such peak usage occurs. In addition, many utilities vary a consumer's rate based on the consumer's peak usage with a higher peak usage causing all of a consumer's usage to be billed at a higher rate. For example, many households peak in energy usage early in the morning when members of the household start their day. If this "spike" in energy usage is used to set a consumer's rate, the consumer will pay this higher rate for all of a billing cycle even though most of the consumer's usage falls far below the more expensive "spike"rate.

For purpose of illustration, it will be assumed that the supplier of line voltage 100 charges a lower ("off peak") rate between the hours of 11 PM and 6 AM, and charges a higher ("on peak") rate between the hours of 6 AM and 11 PM. It is to be understood that this simple "off peak"/"on peak" schedule could be more complex with several off/on peak times, and with differentiation between weekdays and weekend days.

Programmable controller 12 is programmed locally/manually via keyboard 12K or remotely via modem 24 with the "off peak"time(s). In addition to being programmed with times, programmable controller 12 can also be programmed with a calendar so that system 10 can distinguish between weekdays and weekend days in order to take advantage of different rate schedules that may be associated therewith. During the "off peak" times, an internal switch 12S is maintained in a closed position (as shown) to coupled line voltage 100 to output port 12B. Sensor switch 14 senses the voltage on output port 12B and positions its internal switch 16 accordingly. For example, during an "off peak" time with switch 12S closed, sensor switch 14 will sense one of a normal AC voltage or an inadequate AC voltage. That is, a normal AC voltage is indicative of good line voltage and an inadequate AC voltage is indicative of too little or no line voltage due to a line problem such as a power shortage or outage. When a normal AC voltage is sensed, internal switch 16 couples contact 16C to contact 16A so that the normal AC voltage is available across switch 16 and supplied to charger portion 18A. The normal AC voltage is converted to DC by charger portion 18A and supplied to rechargeable DC source 20.

Figure 1A:
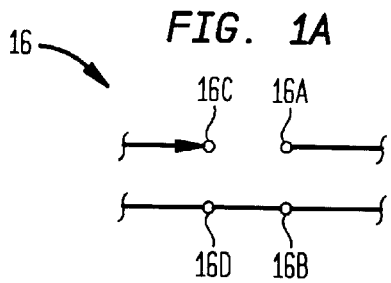
FIG. 1A is an isolated schematic view of the sensor switch's internal switch when an inadequate AC voltage is sensed.

If an inadequate AC voltage is sensed during an "off peak" time when switch 12S is closed, internal switch 16 couples contact 16D to 16B and uncouples contact 16C from contacts 16A and 16D as illustrated in FIG. 1A. As a result, rechargeable DC source 20 begins to discharge through inverter portion 18B so that an AC output voltage (i.e., a normal AC voltage) is made available across switch 16 as contact 16B is coupled to contact 16D. Similarly, during the higher-rate "on peak" time(s), programmable controller 12 opens switch 12S so that sensor switch 14 again senses an inadequate AC voltage at output port 12B. As a result, internal switch 16 is positioned as it would be for a power outage, i.e., contact 16D is coupled to 16B while contact 16C is uncoupled from contacts 16A and 16D as in FIG. 1A, so that rechargeable DC source 20 discharges through inverter portion 18B.

As a result of this first aspect of the present invention, either the normal AC voltage supplied by line voltage 100 or the AC output voltage supplied by inverter portion 18B is always available at controller 12. This will allow the internal clock (not shown) and programming of programmable controller 12 to be maintained at all times. Thus, even in a power outage, programmable controller 12 operates according to its programmed schedule in terms of closing/opening switch 12S. This feature prevents unscheduled changes in switch 12S which, in turn, could result in a consumer's peak time usage to be supplied directly by line voltage 100 instead of rechargeable DC source 20. If this were to occur, a consumer's "spike" in peak time usage could result in the utility applying a higher rate to all of the consumer's energy use as explained above.

During the vast majority of times, line voltage 100 will be able to supply a normal AC voltage to input port 12A. Accordingly, a second aspect of the present invention involves the sharing of both line voltage 100 and the AC output voltage (supplied by inverter portion 18B) by a plurality of loads 30 where three loads 30A, 30B and 30C are shown for purpose of illustration. Loads 30 are coupled to a conventional breaker panel 32 via individual circuit breakers such as circuit breakers 32A, 32B and 32C. Each of loads 30 is individually switchable (e.g., via individually controllable switches 34A, 34B and 34C) between input port 12A (where line voltage 100 is available) and battery port 12D (where the AC output voltage supplied by inverter portion 18B) is available. Switches 34A–34C can be considered to be part of controller 12. However, it is to be understood that the inclusion of switches 34A–34C as part of controller 12 is for illustrative purposes only and is not to be considered a limitation of the present invention. Position of switches 34A–34C is controlled by a power sharing logic module 36 that can be realized by any programmable device (e.g., microprocessor, logic device, etc.) capable implementing logic that will be described below. To assure sufficient start-up power for any of loads 30, each of switches 34A–34C is biased or normally coupled to input port 12A which, presumably, is able to supply whatever level of power is required by loads 30.

Power sharing logic 36 is programmed with a maximum power output capability X (e.g., kilowatts or KW) of rechargeable DC source 20. Typically, power sharing logic 36 will also be coupled to a sensor 38D (e.g., a current or voltage sensor) in order to monitor the actual power output X' of rechargeable DC source 20. In general, power sharing logic 36 controls switches 34A–34C to maximize utilization of power from rechargeable source 20 to thereby reduce demands on line voltage 100. This is accomplished by analyzing the combined power requirements of loads 30 and the power level available (i.e., either maximum level X or a lower actual level X') from rechargeable DC source 20. In addition, system 10 is designed with the knowledge that there is a (power) rate level Z (greater than X) indicative of a utility company's rate level that the user of system 10 does not want to exceed (i.e., the rate level that the user wants the utility company to use to establish a billing rate). Thus, with proper planning based on rate level Z and the known power requirements of loads 30, rechargeable DC source 20 can be sized to provide a maximum power level X that should prevent loads 30 from drawing power from line voltage 100 that would exceed rate level Z.

Since some of loads 30 may require a greater amount of power at start-up (e.g., loads having motors), power sharing logic 36 should be able to recognize such loads as well as adjust the positions of switches 34A–34C to accommodate such start-ups. This is because motor start-ups can typically require a power level that may require substantially all of that available from rechargeable DC source 20. By way of illustrative example, one way to do this is to assign each of loads 30 a priority level recognizable by power sharing logic 36. For example, it will be assumed for this description that load 30A is assigned a priority of "0", load 30B is assigned a priority of "1", and load 30C is assigned a priority of "2". It is further assumed that load 30A has either a steady or fairly constant power draw (e.g., electric clock) or involves appliances that do not have appreciable start-up power requirements (e.g., lights, computers, basic house outlets). Each of loads 30B and 30C is assumed to be a load that is periodic in nature and has an appreciable start-up power requirement (e.g., refrigerator, air conditioner or heat systems, hot tubs, water well pumps, etc.).

As mentioned above, switches 34A–34C are typically biased to be coupled to line voltage 100. If load 30A is active, power sharing logic 36 will immediately be made aware of this by a sensor 38A coupled to the line supplying power to load 30A. Since load 30A is a "0" priority load, power sharing logic 36 immediately causes switch 34A to change positions provided the power requirements of load 30A do not exceed that remaining available (i.e., X–X') from rechargeable DC source 20. With switch 34A coupled to battery port 12D which is supplied by rechargeable DC source 20, load 30A no longer demands power from line voltage 100. If either of loads 30B or 30C are activated, power sharing logic 36 is immediately made aware of this fact by respective sensors 38B and 38C. Since the power requirements at both "start-up" and "steady state" would typically be known and provided to power sharing logic 36, each of sensors 38A, 38B and 38C need only detect the start-up condition of their respective load and provide a signal indicative of such start-up to power sharing logic 36. In this case, sensors 38A, 38B and 38C can be simple current transformers that sense a current draw when the coupled load is activated. One such current transformer is the HAWKEYE in-rush current transformer available commercially from Veris Industries, Portland, Oregon.

Note that the present invention can also be used to monitor the power requirements of loads 30 over a period of time. That is, sensors 38A, 38B and 38C could also be used to measure the start-up and steady state requirements of a load and provide such measurements to power sharing logic 36 during the times that the associated load requires power. Archived measurements for a load can then be used to modify load requirements and/or the priority of a load.

When either or both of loads 30B and 30C is activated, the normal position of respective switches 34B and 34C (i.e., coupled to line voltage 100) allow line voltage 100 to be immediately supplied to loads 30B and 30C, respectively. The priority level associated with each of loads 30 is indicative of a time delay with all priority level "0" loads having a time delay of zero, all priority level "1" loads having a time delay of $\Delta t_1$, and all priority level "2" loads having a time delay of $\Delta t_2 > \Delta t_1$. Power sharing logic 36 keeps the appropriate one of switches 34B and 34C coupled to line voltage 100 for at least the time defined by the associated time delay. At the conclusion of the time delay, power sharing logic 36 evaluates the remaining battery power available (i.e., X–X') and the steady state power requirements of the load to see if it is appropriate to switch that load to rechargeable DC source 20. In the illustrated case, if both loads 30B and 30C are activated simultaneously, the needs of load 30B will be evaluated prior to those of load 30C owing the longer time delay associated with its priority level. Note that during such load balance analysis, power sharing logic 36 can be programmed to switch lower priority loads (such as load 30A) back to line voltage 100 in order to more fully utilize the maximum power output capability X of rechargeable DC source 20.

Operation of the power sharing aspect of the present invention will now be explained by way of illustrative example. In the example, the following is assumed:

| | |
|---|---|
| Maximum power output of rechargeable DC source 20 | 10 KW |
| Load 30A steady power requirement | 2 KW |
| Load 30B steady power requirement after start-up | 5 KW |
| Load 30C steady power requirement after start-up | 5 KW |

Further assume that at time $t_0$, load 30A is activated; at time $t_1$, load 30B is activated; and at time $t_2$, load 30C is activated.

Figure 2A:
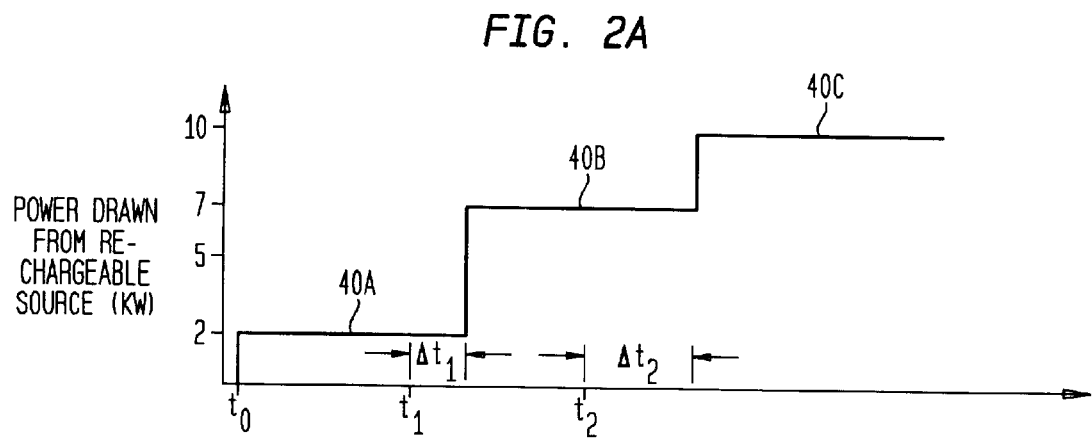
FIG. 2A is a graph of power drawn from the rechargeable DC source as a function of time for a particular example of power sharing in accordance with the present invention.
Figure 2B:
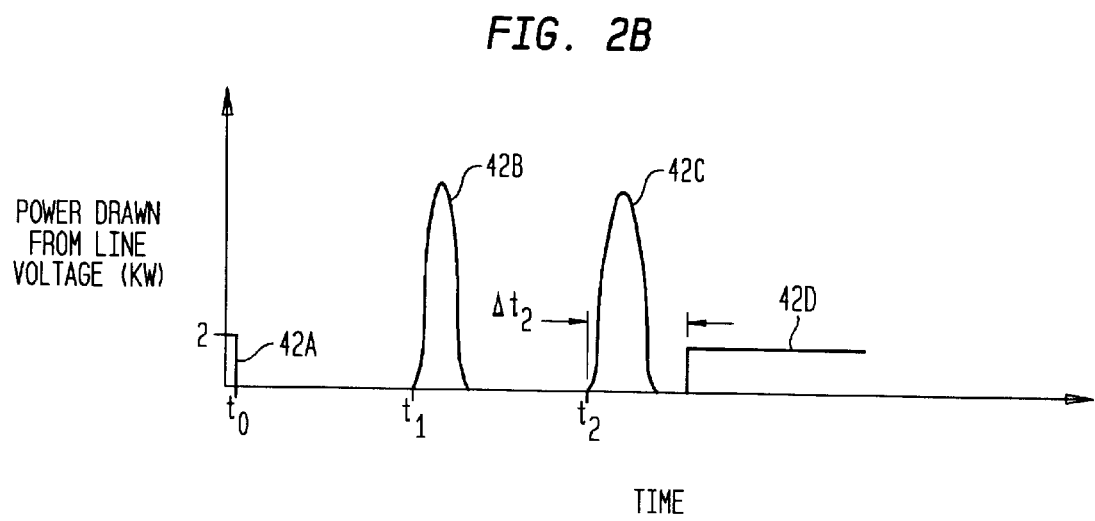
FIG. 2B is a graph of power drawn from the line source as a function of time for the particular example of power sharing.

The advantages of the power sharing aspect of the present invention can be seen by looking at FIG. 2A which depicts the power drawn from rechargeable DC source 20 as a function of time and FIG. 2B which depicts the power drawn from line voltage 100 as a function of time. At time $t_0$, load 30A is turned on and switch 34A is immediately changed to couple load 34A to rechargeable DC source 20 as indicated at respective curves 40A and 42A. At time $t_1$, load 30B is turned on with switch 34B being maintained at line voltage 100 for a time delay of $\Delta t_1$. During time delay $\Delta t_1$, load 30B requires substantial start-up power as indicated by power spike 42B drawn from line voltage 100. At the conclusion of $\Delta t_1$, power sharing logic 36 switches 34B to rechargeable DC source 20 so that both loads 30A and 30B are powered by rechargeable DC source 20 as indicated by curve 30B. At time $t_2$, load 30C is turned on with switch 34C being maintained at line voltage 100 for time delay $\Delta t_2$. During time delay $\Delta t_2$, load 30C requires substantial start-up power as indicated by power spike 42C drawn from line voltage 100. At the conclusion of $\Delta t_2$, power sharing logic 36 evaluates the steady state power requirements of all activated loads (e.g., loads 30A–30C) to best utilize the power available from rechargeable DC source 20. In this example therefore, load 30A is switched back to line voltage 100 as indicated by curve 42D while loads 30B and 30C are coupled to rechargeable DC source 20 for maximum utilization thereof as indicated by curve 40C.

Power sharing logic 36 can also use the above-described priority scheme during power outages when line voltage 100 is non-existent. During such time, load priorities can be used to keep critical appliances coupled to rechargeable DC source 20 for as long as possible while uncoupling non-critical loads (e.g., lower priority levels) from rechargeable DC source 20.

System 10 in FIG. 1 could be modified as illustrated in FIG. 3 to allow for the charging of rechargeable DC source 20 any time that line voltage 100 is available. More specifically, FIG. 3 shows programmable controller 12 incorporating another switch 50 coupled to line voltage 100 and a charging circuit 52 which, in turn, is coupled directly to rechargeable DC source 20. With switch 50 closed, rechargeable DC source 20 can be recharged during any peak or non-peak time, i.e., regardless of the position of switch 12S. In this way, rechargeable DC source 20 can be recharged during the day should demands thereon be greater than usual. The use of a separate charging circuit 52 allows recharging to take place even as rechargeable DC source 20 discharges through inverter 18B. Should the charge on rechargeble DC source 20 drop below a certain level, it is more efficient to keep rechargeable DC source 20 charged with line voltage 100 thereby avoiding a possible greater reliance on line voltage 100 for the supply of intermittently-used loads 30B and 30C as these are the loads that typically cause large spikes in usage.

The advantages of the present invention's power sharing are numerous. A consumer can use the present invention to avail himself of a lower (billing) rate level and can keep usage from spiking over the lower rate level. Further, by maximizing utilization of a rechargeable source that can be recharged during non-peak times, overall demand on line voltage during peak times is greatly reduced. The present invention can also sustain a consumer during extended power outages by providing for auxiliary charging of its rechargeable DC source.

Although the invention has been described relative to specific embodiments thereof, there are numerous variations and modifications that will be readily apparent to those skilled in the art in light of the above teachings. For example, the particular system used for individually switching loads from line voltage 100 to rechargeable DC source 20 is not a limitation of the present invention as a variety of simple logic devices/switches or complex processors with embedded switching can be used. Further, the particular priority scheme can be tailored for a specific industrial or residential application. Still further, the number of loads placed in control of the present invention can vary with the particular application and/or maximum power capability of rechargeable DC source 20. It is therefore to be understood that, within the scope of the appended claims, the invention may be practiced other than as specifically described.

What is claimed as new and desired to be secured by Letters Patent of the United States is:

1. A system for powering a plurality of loads, comprising:

a power supply including rechargeable DC batteries coupled to an inverter/charger circuit that converts a supplied AC voltage to a DC voltage to charge said DC batteries, and that converts a DC output voltage from said DC batteries to an AC output voltage when said DC batteries are discharging;

first means having an input port coupled to an AC voltage source and having an output port, said first means being programmable with at least one selected time period, said first means coupling said AC voltage source to said output port during a non-selected time period that is different than said selected time period and said first means uncoupling said AC voltage source from said output port during said selected time period;

second means coupled to said output port for sensing thereon one of a normal AC voltage and an inadequate AC voltage, said second means including a switch coupled between said output port and said inverter/charger circuit for selectively being placed in one of a first position when said normal AC voltage is sensed and a second position when said inadequate AC voltage is sensed wherein, in said first position, said switch is positioned to supply said normal AC voltage to said inverter/charger circuit as said supplied AC voltage wherein said normal AC voltage is available across said switch, and wherein, in said second position, said switch is positioned to receive said AC output voltage from said inverter/charger circuit as said DC batteries discharge wherein said AC output voltage is available across said switch; and third means coupled to said AC voltage source, said switch in said second position, and the plurality of loads, said third means including a power source selector switch coupled to each of the plurality of loads and positioned to be coupled to one of said AC voltage source and said switch in said second position, wherein one of said normal AC voltage and said AC output voltage is available across said power source selector switch, said third means further including a programmable means coupled to each said power source selector switch for controlling a position thereof based on power requirements of the plurality of loads, wherein each said power source selector switch is individually controlled to maximize usage of said AC output voltage supplied by said power supply.

2. A system as in claim 1 further comprising at least one auxiliary charging circuit coupled directly to said DC batteries for coupling an auxiliary source of current to said DC batteries for charging said DC batteries.

3. A system as in claim 2 wherein said auxiliary source is a DC source, and wherein said auxiliary charging circuit is a DC-to-DC charging circuit.

4. A system as in claim 2 wherein said auxiliary source is an AC source, and wherein said auxiliary charging circuit is an AC-to-DC charging circuit.

5. A system as in claim 1 wherein said DC batteries comprise at least one deep cycle battery.

6. A system as in claim 1 further comprising a modem coupled to said first means for enabling remote programming of said at least one selected period of time.

7. A system for powering a plurality of loads, comprising:

a power supply including rechargeable DC batteries coupled to an inverter/charger circuit that converts a supplied AC voltage to a DC voltage to charge said DC batteries, and that converts a DC output voltage from said DC batteries to an AC output voltage when said DC batteries are discharging;

first means having an input port coupled to an AC voltage source and having an output port, said first means being programmable with at least one selected time period, said first means coupling said AC voltage source to said output port during a non-selected time period that is different than said selected time period and said first means uncoupling said AC voltage source from said output port during said selected time period;

second means coupled to said output port for sensing thereon one of a normal AC voltage and an inadequate AC voltage, said second means including a switch coupled between said output port and said inverter/charger circuit for selectively being placed in one of a first position when said normal AC voltage is sensed and a second position when said inadequate AC voltage is sensed wherein, in said first position, said switch is positioned to supply said normal AC voltage to said inverter/charger circuit as said supplied AC voltage wherein said normal AC voltage is available across said switch, and wherein, in said second position, said switch is positioned to receive said AC output voltage from said inverter/charger circuit as said DC batteries discharge wherein said AC output voltage is available across said switch;

a power source selector switch coupled to each of the plurality of loads and positionable to be coupled to one of said AC voltage source and said switch in said second position, wherein one of said normal AC voltage and said AC output voltage is available across each said power source selector switch; and a programmable device coupled to each said power source selector switch, said programmable device further being coupled to said switch in said second position to monitor said AC output voltage provided by said power supply, said programmable device individually controlling each said power source selector switch to maximize usage of said AC output voltage based on power requirements of each of the plurality of loads requiring power and said AC output voltage.

8. A system as in claim 7 further comprising means coupled to each of the plurality of loads for measuring said power requirements upon activation thereof.

9. A system as in claim 7 wherein said power requirements are known power requirements and wherein said programmable device is programmed with said known power requirements.

10. A system as in claim 9 further comprising a sensing means coupled to at least one of the plurality of loads for detecting a power draw thereby and for generating a signal indicative thereof, said sensing means being coupled to said programmable device for providing said signal thereto wherein said programmable device evaluates said known power requirements of the one of the plurality of loads experiencing said power draw in order to determine a position of said power source selector switch associated with the one of the plurality of loads experiencing the power draw.

11. A system as in claim 10 wherein said sensing means comprises a current transformer.

12. A system as in claim 7 wherein each said power source selector switch has a bias to be coupled to said AC voltage source, and wherein said bias can be overcome by said programmable device whereby said power source selector switch is coupled to said switch in said second position.

13. A system as in claim 7 further comprising at least one auxiliary charging circuit coupled directly to said DC batteries for coupling an auxiliary source of current to said DC batteries for charging said DC batteries.

14. A system as in claim 13 wherein said auxiliary source is a DC source, and wherein said auxiliary charging circuit is a DC-to-DC charging circuit.

15. A system as in claim 13 wherein said auxiliary source is an AC source, and wherein said auxiliary charging circuit is an AC-to-DC charging circuit.

16. A system as in claim 7 wherein said DC batteries comprise at least one deep cycle battery.

17. A system as in claim 7 further comprising a modem coupled to said first means for enabling remote programming of said at least one selected period of time.

18. A system for powering a plurality of loads with each of the plurality of loads having a priority assigned thereto, said system comprising:

a power supply including rechargeable DC batteries coupled to an inverter/charger circuit that converts a supplied AC voltage to a DC voltage to charge said DC batteries, and that converts a DC output voltage from said DC batteries to an AC output voltage when said DC batteries are discharging;

first means having an input port coupled to an AC voltage source and having an output port, said first means being programmable with at least one selected time period, said first means coupling said AC voltage source to said output port during a non-selected time period that is different than said selected time period and said first means uncoupling said AC voltage source from said output port during said selected time period;

second means coupled to said output port for sensing thereon one of a normal AC voltage and an inadequate AC voltage, said second means including a switch coupled between said output port and said inverter/charger circuit for selectively being placed in one of a first position when said normal AC voltage is sensed and a second position when said inadequate AC voltage is sensed wherein, in said first position, said switch is positioned to supply said normal AC voltage to said inverter/charger circuit as said supplied AC voltage wherein said normal AC voltage is available across said switch, and wherein, in said second position, said switch is positioned to receive said AC output voltage from said inverter/charger circuit as said DC batteries discharge wherein said AC output voltage is available across said switch;

a power source selector switch coupled to each of the plurality of loads and normally coupled to said AC voltage source wherein said normal AC voltage is available thereacross, each said power source selector switch being positionable for coupling to said switch in said second position wherein said AC output voltage is available thereacross; and a programmable device coupled to each said power source selector switch, said programmable device further being coupled to said switch in said second position to monitor said AC output voltage provided by said power supply, said programmable device individually controlling a position of each said power source selector switch to maximize usage of said AC output voltage based on i) the priority of each of the plurality of loads requiring power, ii) power requirements of each of the plurality of loads requiring power, and iii) said AC output voltage.

19. A system as in claim 18 wherein the priority associated with each of the plurality of loads is indicative of a time delay, and wherein said programmable device keeps said power source selector switch coupled to said AC voltage source for at least as long said time delay every time each of the plurality of loads initially requires power.

20. A system as in claim 18 further comprising means coupled to each of the plurality of loads for measuring said power requirements upon activation thereof.

21. A system as in claim 18 wherein said power requirements are known power requirements and wherein said programmable device is programmed with said known power requirements.

22. A system as in claim 21 further comprising a sensing means coupled to at least one of the plurality of loads for detecting a power draw thereby and for generating a signal indicative thereof, said sensing means being coupled to said programmable device for providing said signal thereto wherein said programmable device evaluates said known power requirements of the one of the plurality of loads experiencing said power draw in order to determine said position of said power source selector switch associated with the one of the plurality of loads experiencing the power draw.

23. A system as in claim 22 wherein said sensing means comprises a current transformer.

24. A system as in claim 18 further comprising at least one auxiliary charging circuit coupled directly to said DC batteries for coupling an auxiliary source of current to said DC batteries for charging said DC batteries.

25. A system as in claim 24 wherein said auxiliary source is a DC source, and wherein said auxiliary charging circuit is a DC-to-DC charging circuit.

26. A system as in claim 24 wherein said auxiliary source is an AC source, and wherein said auxiliary charging circuit is an AC-to-DC charging circuit.

27. A system as in claim 18 wherein said DC batteries comprise at least one deep cycle battery.

28. A system as in claim 18 further comprising a modem coupled to said first means for enabling remote programming of said at least one selected period of time.

29. A system as in claim 18 further comprising means, coupled between said AC voltage source and said DC batteries, for bypassing said first means to permit charging of said DC batteries using said AC voltage source.

* * * * *